United States Patent
Suzuki

(10) Patent No.: US 10,437,172 B2
(45) Date of Patent: Oct. 8, 2019

(54) SEMICONDUCTOR ROLLER

(71) Applicant: SUMITOMO RUBBER INDUSTRIES, LTD., Kobe-shi, Hyogo (JP)

(72) Inventor: Daijiro Suzuki, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 9 days.

(21) Appl. No.: 15/797,887

(22) Filed: Oct. 30, 2017

(65) Prior Publication Data
US 2018/0136581 A1    May 17, 2018

(30) Foreign Application Priority Data
Nov. 14, 2016    (JP) .................................. 2016-221881

(51) Int. Cl.
| | |
|---|---|
| *G03G 15/02* | (2006.01) |
| *G03G 15/08* | (2006.01) |
| *G03G 15/16* | (2006.01) |
| *C08L 19/00* | (2006.01) |
| *C08L 9/02* | (2006.01) |
| *G03G 21/00* | (2006.01) |

(52) U.S. Cl.
CPC ............ *G03G 15/0818* (2013.01); *C08L 9/02* (2013.01); *C08L 19/00* (2013.01); *G03G 15/0233* (2013.01); *G03G 15/162* (2013.01); *G03G 21/0058* (2013.01)

(58) Field of Classification Search
CPC ............ G03G 15/0233; G03G 15/162; G03G 21/0058
See application file for complete search history.

(56) References Cited

U.S. PATENT DOCUMENTS

| | | | |
|---|---|---|---|
| 2009/0233776 A1* | 9/2009 | Mizumoto | G03G 15/0233 492/18 |
| 2014/0097388 A1* | 4/2014 | Niwa | C08L 71/03 252/511 |

FOREIGN PATENT DOCUMENTS

JP    2014-80456 A    5/2014

* cited by examiner

*Primary Examiner* — Ramsey Zacharia
(74) *Attorney, Agent, or Firm* — Birch, Stewart, Kolasch & Birch, LLP

(57) ABSTRACT

A semiconductive roller is provided, which includes a roller body made of a crosslinked product of a rubber composition containing a rubber component including epichlorohydrin rubber and diene rubber, and a crosslinking component including:
(a) 4,4'-dithiodimorpholine;
(b) sulfur;
(c) a thiourea compound; and
(d) a thiuram accelerating agent;
wherein the proportion R (part by mass) of 4,4'-dithiodimorpholine and the proportion S (part by mass) of sulfur based on 100 parts by mass of the overall rubber component satisfy the following expressions (1) and (2):

$$2R \geq S \quad (1)$$

$$0.5R + S > 0.4 \quad (2).$$

8 Claims, 1 Drawing Sheet

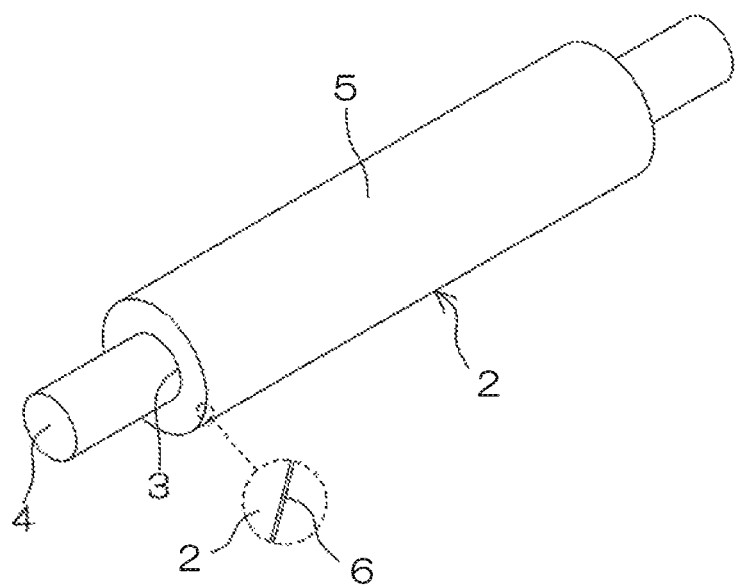

SEMICONDUCTOR ROLLER

CROSS-REFERENCE TO RELATED APPLICATIONS

This application corresponds to Japanese Patent Application No. 2016-221881, filed in the Japan Patent Office on Nov. 14, 2016, the disclosure of which is incorporated herein by reference in its entirety.

TECHNICAL FIELD

The present invention relates to a semiconductive roller.

BACKGROUND ART

Advantageously used as a developing roller, a charging roller or the like to be incorporated in an electrophotographic image forming apparatus is a semiconductive roller which includes a roller body produced by forming a semiconductive rubber composition into a tubular body and crosslinking the tubular body in order to provide sufficient abutment nip with respect to a photoreceptor body or the like and properly impart the roller with the corresponding function.

In order to control the roller resistance of the semiconductive roller within a roller resistance range that is suitable for the developing roller, the charging roller or the like, an ion conductive rubber such as epichlorohydrin rubber is often used as a rubber component for the rubber composition.

Further, diene rubber is often used in combination with the ion conductive rubber as the rubber component in order to impart the rubber composition with proper processability, to improve the mechanical strength, the durability and the like of the roller body, or to impart the roller body with proper rubber characteristic properties, i.e., to make the roller body flexible and less susceptible to permanent compressive deformation with a reduced compression set.

The rubber composition further contains a crosslinking component for crosslinking the rubber component.

In Patent Document 1 (JP2014-80456A), for example, sulfur crosslinking agent, a thiourea compound, a thiuram accelerating agent and a thiazole accelerating agent are used in combination as the crosslinking component. Sulfur is used as the sulfur crosslinking agent.

Patent Document 1 states that these compounds are used in predetermined proportions as the crosslinking component, whereby the roller body is imparted with lower hardness and hence higher flexibility and a reduced compression set to be thereby further advantageously prevented from suffering from uneven image formation which may otherwise occur due to the permanent compressive deformation.

SUMMARY OF INVENTION

However, the inventor of the present invention found that the rubber composition disclosed in Patent Document 1 is liable to suffer from a scorching problem in a shorter scorching period.

The thiazole accelerating agent of the crosslinking component functions, together with a sulfenamide accelerating agent or the like, as a retarder for preventing the scorching of the rubber composition. However, the effect of the thiazole accelerating agent in the rubber composition disclosed in Patent Document 1 is insufficient.

Specifically, the scorching problem is liable to arise, for example, after the rubber composition is stored under improper conditions (e.g., at a higher temperature), after the rubber composition is stored for a relatively long period (e.g., for about one week), when the rubber composition is once fed into an extruder to be extruded and, before being crosslinked, recycled to be used again for the extrusion for an operational reason, or when the rubber composition is extruded at an increased extrusion rate.

With the use of the scorched rubber composition, it will be impossible to produce the roller body which has the desired properties, i.e., which is flexible and less susceptible to the permanent compressive deformation with a reduced compression set as described above. Therefore, the rubber composition is liable to be wasted.

It is an object of the present invention to provide a semiconductive roller including a roller body which is flexible and less susceptible to the permanent compressive deformation with a reduced compression set and can be produced without the scorching and the waste of the rubber composition in extrusion.

According to the present invention, there is provided a semiconductive roller which includes a roller body made of a crosslinked product of a rubber composition containing a rubber component including epichlorohydrin rubber and diene rubber, and a crosslinking component including:
(a) 4,4'-dithiodimorpholine;
(b) sulfur;
(c) a thiourea compound; and
(d) a thiuram accelerating agent;
wherein a proportion R (part by mass) of 4,4'-dithiodimorpholine and a proportion S (part by mass) of sulfur based on 100 parts by mass of the overall rubber component satisfy the following expressions (1) and (2):

$$2R \geq S \quad (1)$$

$$0.5R + S > 0.4 \quad (2)$$

Advantageous Effects of Invention

According to the present invention, it is possible to provide the semiconductive roller including the roller body which is flexible and less susceptible to the permanent compressive deformation with a reduced compression set and which can be produced without the scorching and the waste of the rubber composition in the extrusion.

BRIEF DESCRIPTION OF DRAWINGS

The FIGURE is a perspective view showing a semiconductive roller according to an embodiment of the present invention.

DESCRIPTION OF EMBODIMENTS

A semiconductive roller according to the present invention includes a roller body made of a crosslinked product of a rubber composition which contains a rubber component including epichlorohydrin rubber and diene rubber, and a crosslinking component including:
(a) 4,4'-dithiodimorpholine;
(b) sulfur;
(c) a thiourea compound; and
(d) a thiuram accelerating agent;
wherein the proportion R (part by mass) of 4,4'-dithiodimorpholine and the proportion S (part by mass) of sulfur based on 100 parts by mass of the overall rubber component satisfy the following expressions (1) and (2):

$$2R \geq S \quad (1)$$

$$0.5R+S>0.4 \quad (2)$$

4,4'-dithiodimorpholine is a crosslinking agent having a two-stage crosslinking mechanism such that 4,4'-dithiodimorpholine is first decomposed at a crosslinking temperature to release active sulfur which in turn crosslinks the rubbers. 4,4'-dithiodimorpholine suppresses rapid crosslinking of the rubber composition as compared with a case in which sulfur is directly blended as the crosslinking agent.

Where 4,4'-dithiodimorpholine and sulfur are blended in the predetermined proportions satisfying the above expressions (1) and (2), it is possible to suppress the scorching of the rubber composition even in the scorching-prone environment and hence to minimize the waste of the rubber composition.

In addition, where 4,4'-dithiodimorpholine and sulfur are used in combination with the diene rubber, the thiourea compound and the thiuram accelerating agent, the resulting roller body is flexible and less susceptible to the permanent compressive deformation with a reduced compression set.

In Patent Document 1,4,4'-dithiodimorpholine (N,N-dithiobismorpholine) is described as a sulfur crosslinking agent simply by way of example. In Patent Document 1, there is no teaching that 4,4'-dithiodimorpholine and sulfur are blended in the predetermined proportions satisfying the above expressions (1) and (2) and the aforementioned unique effect is provided by the blending.

<Rubber Component>

The epichlorohydrin rubber and the diene rubber are used in combination as the rubber component. The combinational use of these two types of rubbers makes it possible to impart the rubber composition for the roller body with proper semiconductivity. In addition, the resulting roller body is flexible and less susceptible to the permanent compressive deformation with a reduced compression set.

(Epichlorohydrin Rubber)

Various ion-conductive polymers containing epichlorohydrin as a repeating unit are usable as the epichlorohydrin rubber.

Examples of the epichlorohydrin rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used alone or in combination.

Of these epichlorohydrin rubbers, the ethylene oxide-containing copolymers, particularly the ECO and/or the GECO, are preferred for combinational use with the diene rubber for reducing the roller resistance of the semiconductive roller to the roller resistance range suitable for the developing roller, the charging roller or the like.

These copolymers preferably each have an ethylene oxide content of not less than 30 mol % and not greater than 80 mol %, particularly preferably not less than 50 mol %.

Ethylene oxide functions to reduce the roller resistance of the semiconductive roller. If the ethylene oxide content is less than the aforementioned range, however, it will be impossible to sufficiently provide this function and hence to sufficiently reduce the roller resistance.

If the ethylene oxide content is greater than the aforementioned range, on the other hand, ethylene oxide is liable to be crystallized, whereby the segment motion of molecular chains is hindered to adversely increase the roller resistance of the semiconductive roller. Further, the roller body is liable to have an excessively high hardness after the crosslinking, and the rubber composition is liable to have a higher viscosity and, hence, poorer processability when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the semiconductive roller. However, if the allyl glycidyl ether content is less than the aforementioned range, it will be impossible to sufficiently provide this function and, hence, to sufficiently reduce the roller resistance.

Allyl glycidyl ether also functions as crosslinking sites during the crosslinking of the GECO. Therefore, if the allyl glycidyl ether content is greater than the aforementioned range, the crosslinking density of the GECO is excessively increased, whereby the segment motion of molecular chains is hindered to adversely increase the roller resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.5 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these GECOs are usable.

These epichlorohydrin rubbers may be used alone or in combination.

(Diene Rubber)

As described above, the diene rubber functions to impart the rubber composition with proper processability, to improve the mechanical strength, the durability and the like of the roller body, or to impart the roller body with proper rubber characteristic properties, i.e., to make the roller body flexible and less susceptible to the permanent compressive deformation with a reduced compression set.

An oxide film is often formed in the outer peripheral surface of the roller body by irradiating the outer peripheral surface with ultraviolet radiation in an oxidizing atmosphere or the like to condition the surface for suppression of adhesion of toner and the like or to reduce the dielectric dissipation factor of the semiconductive roller. In this case, the diene rubber is oxidized by the irradiation with the ultraviolet radiation for the formation of the oxide film in the outer peripheral surface of the roller body.

Examples of the diene rubber include natural rubber, isoprene rubber (IR), butadiene rubber (BR), styrene butadiene rubber (SBR), chloroprene rubber (CR) and acrylonitrile butadiene rubber (NBR), which may be used alone or in combination. NBR is particularly preferred.

The NBR, which is a polar rubber, has a function for finely controlling the roller resistance of the semiconductive roller in addition to the aforementioned function as the diene rubber.

A lower acrylonitrile content type NBR having an acrylonitrile content of not greater than 24%, an intermediate acrylonitrile content type NBR having an acrylonitrile content of 25 to 30%, an intermediate to higher acrylonitrile content type NBR having an acrylonitrile content of 31 to 35%, a higher acrylonitrile content type NBR having an acrylonitrile content of 36 to 42% and a very high acrylonitrile content type NBR having an acrylonitrile content of not less than 43% are usable as the NBR.

The NBRs include those of an oil-extension type having flexibility controlled by addition of an extension oil, and those of a non-oil-extension type containing no extension oil. In the present invention, a non-oil-extension type NBR which does not contain the extension oil (which may be a bleed substance) is preferably used for the prevention of the contamination of the photoreceptor body and the like.

These NBRs may be used alone or in combination.

(Proportions of Rubbers)

The proportions of the rubbers may be properly determined according to required characteristic properties of the semiconductive roller, specifically, the roller resistance of the semiconductive roller, the flexibility of the roller body and the like.

However, the proportion of the epichlorohydrin rubber is preferably not less than 15 parts by mass and not greater than 80 parts by mass, particularly preferably not less than 30 parts by mass and not greater than 70 parts by mass, based on 100 parts by mass of the overall rubber component.

If the proportion of the epichlorohydrin rubber is less than the aforementioned range, it will be impossible to sufficiently reduce the roller resistance of the semiconductive roller to the range suitable for the developing roller, the charging roller and the like.

If the proportion of the epichlorohydrin rubber is greater than the aforementioned range, on the other hand, the proportion of the diene rubber is relatively reduced, making it impossible to impart the rubber composition with proper processability, to impart the roller body with the aforementioned proper rubber characteristic properties or to continuously form the oxide film having the aforementioned function in the outer peripheral surface of the roller body.

Where the proportion of the epichlorohydrin rubber falls within the aforementioned range, in contrast, it is possible to sufficiently reduce the roller resistance of the semiconductive roller to the range suitable for the developing roller, the charging roller or the like while providing the aforementioned effect of the combinational use of the epichlorohydrin rubber and the diene rubber.

The proportion of the diene rubber is a balance obtained by subtracting the proportion of the epichlorohydrin rubber from the total. That is, the proportion of the epichlorohydrin rubber is set within the predetermined range, and the proportion of the diene rubber is set so that the sum of the proportion of the epichlorohydrin rubber and the proportion of the diene rubber is 100 parts by mass. Where the proportion of the epichlorohydrin rubber is not less than 15 parts by mass and not greater than 80 parts by mass, particularly not less than 30 parts by mass and not greater than 70 parts by mass, based on 100 parts by mass of the overall rubber component, for example, the proportion of the diene rubber is preferably not less than 20 parts by mass and not greater than 85 parts by mass, particularly preferably not less than 30 parts by mass and not greater than 70 parts by mass, based on 100 parts by mass of the overall rubber component.

<Crosslinking Component>

As described above, the crosslinking component includes:
(a) 4,4'-dithiodimorpholine;
(b) sulfur;
(c) a thiourea compound; and
(d) a thiuram accelerating agent;
wherein the proportion R (part by mass) of 4,4'-dithiodimorpholine (a) and the proportion S (part by mass) of sulfur (b) based on 100 parts by mass of the overall rubber component satisfy the following expressions (1) and (2):

$$2R \geq S \quad (1)$$

$$0.5R + S > 0.4 \quad (2)$$

If the proportion R (part by mass) of 4,4'-dithiodimorpholine is smaller and the proportion S (part by mass) of sulfur is greater than those expressed by the above expression (1) so that the following expression (1)' is satisfied:

$$2R < S \quad (1)',$$

the rubber composition is liable to be scorched in a shorter scorching period.

If the proportions R and S (part by mass) are insufficient to satisfy the expression (2), but satisfy the following expression (2)':

$$0.5R + S \leq 0.4 \quad (2)',$$

the rubber crosslinking density will be insufficient, so that the roller body is susceptible to the permanent compressive deformation with an increased compression set.

Where the proportions R and S (part by mass) of the respective crosslinking agents satisfy both the expressions (1) and (2), in contrast, it is possible to produce the semiconductive roller including the roller body which is flexible and less susceptible to the permanent compressive deformation with a reduced compression set and can be produced without the scorching and the waste in the extrusion.

Specific ranges for the proportions R and S (part by mass) of the respective crosslinking agents are not particularly limited. However, the proportion R (part by mass) of 4,4'-dithiodimorpholine is preferably not less than 0.3 parts by mass and not greater than 2 parts by mass, particularly preferably not greater than 1 part by mass, based on 100 parts by mass of the overall rubber component.

The proportion S (part by mass) of sulfur is preferably not less than 0.2 parts by mass and not greater than 0.7 parts by mass based on 100 parts by mass of the overall rubber component.

The proportions R and S (part by mass) of the crosslinking agents are respectively adjusted within these ranges to satisfy the above expressions (1) and (2).

Where oil-treated sulfur powder or dispersive sulfur is used as the sulfur, for example, the proportion of the sulfur described above is defined as the effective proportion of sulfur contained in the oil-treated sulfur powder or the dispersive sulfur.

Examples of the thiourea compound (c) include ethylene thiourea, N,N'-diphenylthiourea, trimethylthiourea, thioureas represented by the following formula (1):

$$(C_nH_{2n+1}NH)_2C=S \quad (1)$$

(wherein n is an integer of 1 to 12), and tetramethylthiourea, which may be used alone or in combination. Ethylene thiourea is particularly preferred.

The proportion of the thiourea compound to be blended is preferably not less than 0.1 part by mass and not greater than 1 part by mass, particularly preferably not less than 0.2 parts by mass and not greater than 0.6 parts by mass, based on 100 parts by mass of the overall rubber component in order to impart the semiconductive roller with the aforementioned proper rubber characteristic properties.

Examples of the thiuram accelerating agent (d) include tetramethylthiuram monosulfide, tetramethylthiuram disulfide, tetraethylthiuram disulfide, tetrabutylthiuram disulfide, tetrakis(2-ethylhexyl)thiuram disulfide and dipentamethylenethiuram tetrasulfide, which may be used alone or in combination. Tetramethylthiuram monosulfide is particularly preferred.

The proportion of the thiuram accelerating agent to be blended is preferably not less than 0.3 parts by mass and not greater than 1.5 parts by mass, particularly preferably not less than 0.5 parts by mass and not greater than 1 part by mass, based on 100 parts by mass of the overall rubber component in order to impart the semiconductive roller with the aforementioned proper rubber characteristic properties.

A guanidine accelerating agent, a sulfenamide accelerating agent and/or a thiazole accelerating agent may be further used for the crosslinking component.

Examples of the guanidine accelerating agent include 1,3-di-o-tolylguanidine, 1,3-diphenylguanidine, and 1-o-tolylbiguanide, which may be used alone or in combination. 1,3-di-o-tolylguanidine is particularly preferred.

The proportion of the guanidine accelerating agent is preferably not less than 0.1 part by mass and not greater than 1 part by mass, particularly preferably not greater than 0.6 parts by mass, based on 100 parts by mass of the overall rubber component.

Examples of the sulfenamide accelerating agent include N-cyclohexyl-2-benzothiazolyl sulfenamide, N,N-dicyclohexyl-2-benzothiazolyl sulfenamide, N-oxydiethylene-2-benzothiazolyl sulfenamide and N-(tert-butyl)-2-benzothiazolyl sulfenamide, which may be used alone or in combination. N-cyclohexyl-2-benzothiazolyl sulfenamide is particularly preferred.

The proportion of the sulfenamide accelerating agent is preferably not less than 0.2 parts by mass and not greater than 1.5 parts by mass, particularly preferably not greater than 0.8 parts by mass, based on 100 parts by mass of the overall rubber component.

Examples of the thiazole accelerating agent include 2-mercaptobenzothiazole, di-2-benzothiazolyl disulfide, a zinc salt of 2-mercaptobenzothiazole, a cyclohexylamine salt of 2-mercaptobenzothiazole and 2-(4'-morpholinodithio)benzothiazole, which may be used alone or in combination.

The proportion of the thiazole accelerating agent is preferably not less than 0.2 parts by mass and not greater than 1.5 parts by mass, particularly preferably not greater than 0.8 parts by mass, based on 100 parts by mass of the overall rubber component.

<Other Ingredients>

As required, various additives may be added to the rubber composition. Examples of the additives include a crosslinking acceleration assisting agent, an acid accepting agent and a filler.

Examples of the crosslinking acceleration assisting agent include metal compounds such as zinc oxide (zinc white), and fatty acids such as stearic acid, oleic acid and cotton seed fatty acids, and other conventionally known crosslinking acceleration assisting agents, which may be used alone or in combination.

The proportions of these crosslinking acceleration assisting agent are each preferably not less than 0.1 part by mass and not greater than 7 parts by mass based on 100 parts by mass of the overall rubber component.

In the presence of the acid accepting agent, chlorine-containing gases generated from the epichlorohydrin rubber and the like during the crosslinking are prevented from remaining in the roller body. Thus, the acid accepting agent functions to prevent the inhibition of the crosslinking and the contamination of the photoreceptor body and the like, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. The hydrotalcites are particularly preferred.

Where the hydrotalcites are used in combination with magnesium oxide or potassium oxide, a higher acid accepting effect can be provided, thereby more reliably preventing the contamination of the photoreceptor body and the like.

The proportion of the acid accepting agent to be added is preferably not less than 0.1 part by mass and not greater than 7 parts by mass based on 100 parts by mass of the overall rubber component.

If the proportion of the acid accepting agent is less than the aforementioned range, it will be impossible to sufficiently provide the effect of the addition of the acid accepting agent.

If the proportion of the acid accepting agent is greater than the aforementioned range, the roller body is liable to have an excessively high hardness after the crosslinking and, therefore, damage the toner when being repeatedly brought into contact with the toner in repeated image formation. If the percentage of the toner damaged to be broken into particles is increased, the chargeability or the like of the broken toner particles is significantly deviated from that of normal toner, so that the toner is more liable to adhere to the margin of a formed image to cause the fogging.

Examples of the filler include zinc oxide, silica, carbon black, clay, talc, calcium carbonate, magnesium carbonate and aluminum hydroxide, which may be used alone or in combination.

The addition of the filler improves the mechanical strength and the like of the roller body The roller body may be imparted with electron conductivity by using electrically conductive carbon black as the filler.

For improvement of the mechanical strength and the like of the roller body, the proportion of the filler to be added is preferably not less than 3 parts by mass, particularly preferably not less than 5 parts by mass, based on 100 parts by mass of the overall rubber component. Further, the proportion of the filler to be added is preferably not greater than 20 parts by mass, particularly preferably not greater than 10 parts by mass, based on 100 parts by mass of the overall rubber component in order to impart even a nonporous roller body, for example, with proper flexibility.

Other examples of the additives include a degradation preventing agent, an anti-scorching agent, a plasticizer, a lubricant, a processing aid, a pigment, an antistatic agent, a flame retarder, a neutralizing agent, a nucleating agent and a co-crosslinking agent, which may be blended in proper proportions.

<<Semiconductive Roller>>

The FIGURE is a perspective view showing a semiconductive roller according to an embodiment of the present invention.

Referring to the FIGURE, the semiconductive roller 1 according to this embodiment includes a tubular roller body 2 having a nonporous single-layer structure. A shaft 4 is inserted through and fixed to a center through-hole 3 of the roller body 2.

The shaft 4 is a unitary member made of a metal such as aluminum, an aluminum alloy or a stainless steel.

The shaft 4 is electrically connected to and mechanically fixed to the roller body 2, for example, via an electrically conductive adhesive agent. Alternatively, a shaft having an outer diameter that is greater than the inner diameter of the through-hole 3 is used as the shaft 4, and press-inserted into the through-hole 3 to be electrically connected to and mechanically fixed to the roller body 2.

The roller body 2 has an oxide film 6 formed in an outer peripheral surface 5 thereof as shown in the FIGURE on an enlarged scale.

The oxide film 6 thus formed functions as a dielectric layer to reduce the dielectric dissipation factor of the semiconductive roller 1. Further, the oxide film 6 serves as a lower friction layer which advantageously suppresses the adhesion of the toner.

In addition, the oxide film 6 can be easily formed through oxidation of the diene rubber contained in the rubber composition in the outer peripheral surface 5, for example, by irradiating the outer peripheral surface 5 with ultraviolet radiation in an oxidizing atmosphere. This suppresses the reduction in the productivity of the semiconductive roller 1 and the increase in the production costs of the semiconductive roller 1.

The term "single-layer structure" of the roller body 2 means that the roller body 2 includes a single layer of the rubber component and the like, and the oxide film 6 formed by the irradiation with the ultraviolet radiation or the like is not counted.

For production of the semiconductive roller 1, the rubber composition is first prepared, and fed into an extruder to be extruded into a tubular body. Then, the tubular body is cut to a predetermined length, and crosslinked in a vulcanization can by pressure and heat.

Subsequently, the crosslinked tubular body is secondarily crosslinked with heating in an oven or the like, and then cooled. Thereafter, the resulting tubular body is polished to a predetermined outer diameter. Thus, the roller body 2 is formed.

Various polishing methods such as a dry traverse polishing method can be employed for the polishing.

The outer peripheral surface 5 may be mirror-finished at the final stage of the polishing step. In this case, the mirror-finishing improves the releasability of the outer peripheral surface 5 and, with or without the formation of the oxide film 6, further advantageously suppresses the adhesion of the toner to the outer peripheral surface 5. This effectively prevents the contamination of the photoreceptor body and the like.

The shaft 4 may be inserted through and fixed to the through-hole 3 at any time between the end of the cutting of the tubular body and the end of the polishing.

However, it is preferred to carry out the secondary crosslinking and the polishing with the shaft 4 inserted through the through-hole 3 after the cutting. This suppresses the warpage and the deformation of the roller body 2, which may otherwise occur due to the expansion and the contraction of the tubular body during the secondary crosslinking. Further, the tubular body may be polished while being rotated about the shaft 4. This improves the working efficiency in the polishing, and suppresses the deflection of the outer peripheral surface 5.

As previously described, the shaft 4 having an outer diameter greater than the inner diameter of the through-hole 3 may be press-inserted into the through-hole 3, or the shaft 4 may be inserted through the through-hole 3 of the tubular body with the intervention of an electrically conductive thermosetting adhesive agent between the shaft 4 and the tubular body before the secondary crosslinking.

In the former case, the electrical connection and the mechanical fixing are achieved simultaneously with the press insertion of the shaft 4.

In the latter case, the thermosetting adhesive agent is cured when the tubular body is secondarily crosslinked with heating in the oven, whereby the shaft 4 is electrically connected to and mechanically fixed to the roller body 2.

As described above, the formation of the oxide film 6 is preferably achieved by irradiating the outer peripheral surface 5 of the roller body 2 with the ultraviolet radiation. That is, this method is simple and efficient, because the formation of the oxide film 6 is achieved simply through the oxidation of the diene rubber contained in the rubber composition in the outer peripheral surface 5 of the roller body 2 by irradiating the outer peripheral surface 5 with ultraviolet radiation having a predetermined wavelength for a predetermined period.

In addition, the oxide film 6 formed by the irradiation with the ultraviolet radiation is free from conventional problems associated with a coating film formed by applying a coating agent, and is highly uniform in thickness, and ensures tight adhesion thereof to the roller body 2.

The wavelength of the ultraviolet radiation to be used for the irradiation is preferably not less than 100 nm and not greater than 400 nm, particularly preferably not greater than 300 nm, in order to efficiently oxidize the diene rubber contained in the rubber composition for the formation of the oxide film 6 excellent in the aforementioned functions. The irradiation period is preferably not shorter than 30 seconds and not longer than 30 minutes, particularly preferably not shorter than 1 minute and not longer than 20 minutes.

The oxide film 6 may be formed by other methods and, in some case, may be obviated.

The roller body 2 of the semiconductive roller 1 having a nonporous single-layer structure preferably has a type-A durometer hardness of not lower than 52 and not higher than 56.

If the type-A durometer hardness is lower than the aforementioned range, the roller body 2 is susceptible to the permanent compressive deformation with an increased compression set.

If the type-A durometer hardness is higher than the aforementioned range, on the other hand, the roller body 2 is liable to have an excessively high hardness to damage the toner as described above, thereby causing defective image formation such as the fogging.

Where the type-A durometer hardness falls within the aforementioned range, in contrast, the roller body 2 is flexible and less susceptible to the permanent compressive deformation with a reduced compression set. Therefore, the semiconductive roller 1 is substantially free from the defective image formation such as the fogging.

To control the type-A durometer hardness within the aforementioned range, the types and the proportions of the ingredients described above may be properly changed within the aforementioned ranges.

The inventive semiconductive roller 1 can be advantageously used not only as a developing roller or a charging roller but also as a transfer roller, a cleaning roller or the like to be incorporated in an electrophotographic image forming apparatus such as a laser printer, an electrostatic copying machine, a plain paper facsimile machine, and a printer-copier-facsimile multifunction machine.

EXAMPLES

The present invention will hereinafter be described in greater detail by way of Examples and Comparative Examples, which are presented as illustrative and are not intended to limit the invention.

Example 1

(Preparation of Rubber Composition)

A rubber component was prepared by blending 60 parts by mass of GECO (HYDRIN (registered trade name) T3108 available from Nippon Zeon Corporation) and 40 parts by mass of NBR (intermediate to higher acrylonitrile content NBR of non-oil-extension type, Nipol (registered trade name) DN219 available from Nippon Zeon Corporation, and having an acrylonitrile content of 33.5%).

While 100 parts by mass of the resulting rubber component was simply kneaded by means of a Banbury mixer, the following ingredients were added to and kneaded with the rubber component.

TABLE 1

| Ingredients | Parts by mass |
| --- | --- |
| Zinc oxide type-2 | 5 |
| Hydrotalcites | 3 |
| Carbon black | 7 |

The ingredients shown in Table 1 are as follows. The amounts (parts by mass) of the ingredients shown in Table 1 are based on 100 parts by mass of the overall rubber component. Zinc oxide type-2: Crosslinking acceleration assisting agent (available from Sakai Chemical Industry Co., Ltd.) Hydrotalcites: Acid accepting agent (DHT-4A (registered trade name) 2 available from Kyowa Chemical Industry Co., Ltd.) Carbon black: FEF, SEAST SO available from Tokai Carbon Co., Ltd.

While the resulting mixture was continuously kneaded, the following crosslinking component was further added to and kneaded with the mixture. Thus, a rubber composition was prepared.

TABLE 2

| Ingredients | Parts by mass |
| --- | --- |
| 4,4'-dithiodimorpholine | 0.4 |
| Sulfur powder | 0.3 |
| Thiourea compound | 0.3 |
| Thiuram accelerating agent | 0.7 |

The ingredients shown in Table 2 are as follows. The amounts (parts by mass) of the ingredients shown in Table 2 are based on 100 parts by mass of the overall rubber component. 4,4'-dithiodimorpholine: BALNOCK (registered trade name) R available from Ouchi Shinko Chemical Industrial Co., Ltd. Sulfur powder: Available from Tsurumi Chemical Industry Co., Ltd.
Thiourea compound: Ethylene thiourea (2-mercaptoimidazoline ACCEL (registered trade name) 22-S available from Kawaguchi Chemical Industry Co., Ltd.)
Thiuram accelerating agent: Tetramethylthiuram monosulfide (SANCELER (registered trade name) TS available from Sanshin Chemical Industry Co., Ltd.)

The proportion R (part by mass) of 4,4'-dithiodimorpholine and the proportion S (part by mass) of sulfur had the following relationships:

$$2R=0.8>0.3=S \qquad (1)''$$

$$0.5R+S=0.5>0.4 \qquad (2)''$$

Therefore, the above expressions (1) and (2) were satisfied.

Example 2

A rubber composition was prepared in substantially the same manner as in Example 1, except that the proportion R of 4,4'-dithiodimorpholine and the proportion S of sulfur for the crosslinking component were 0.3 parts by mass and 0.5 parts by mass, respectively.

The proportions R and S had the following relationships:

$$2R=0.6>0.5=S \qquad (1)''$$

$$0.5R+S=0.65>0.4 \qquad (2)''$$

Therefore, the above expressions (1) and (2) were satisfied.

Example 3

A rubber composition was prepared in substantially the same manner as in Example 1, except that the proportion R of 4,4'-dithiodimorpholine and the proportion S of sulfur for the crosslinking component were 0.35 parts by mass and 0.7 parts by mass, respectively.

The proportions R and S had the following relationships:

$$2R=0.7=0.7=S \qquad (1)''$$

$$0.5R+S=0.875>0.4 \qquad (2)''$$

Therefore, the above expressions (1) and (2) were satisfied.

Comparative Example 1

A rubber composition was prepared in substantially the same manner as in Example 1, except that the proportion R of 4,4'-dithiodimorpholine and the proportion S of sulfur for the crosslinking component were 0.3 parts by mass and 1 part by mass, respectively.

The proportions R and S had the following relationships:

$$2R=0.6<1=S \qquad (1)''$$

$$0.5R+S=1.15>0.4 \qquad (2)''$$

Therefore, the expression (2) was satisfied, but the expression (1) was not satisfied.

Comparative Example 2

A rubber composition was prepared in substantially the same manner as in Example 1, except that the proportion R of 4,4'-dithiodimorpholine and the proportion S of sulfur for the crosslinking component were 0.2 parts by mass and 0.5 parts by mass, respectively.

The proportions R and S had the following relationships:

$$2R = 0.4 < 0.5 = S \tag{1}''$$

$$0.5R + S = 0.6 > 0.4 \tag{2}''$$

Therefore, the expression (2) was satisfied, but the expression (1) was not satisfied.

Comparative Example 3

A rubber composition was prepared in substantially the same manner as in Example 1, except that the proportion R of 4,4'-dithiodimorpholine and the proportion S of sulfur for the crosslinking component were 0.2 parts by mass and 0.3 parts by mass, respectively.

The proportions R and S had the following relationships $$2R = 0.4 > 0.3 = S \tag{1}''$$

$$0.5R + S = 0.4 = 0.4 \tag{2}''$$

Therefore, the expression (1) was satisfied, but the expression (2) was not satisfied.

Example 4

A rubber composition was prepared in substantially the same manner as in Example 3, except that the proportions of the GECO and the NBR were 40 parts by mass and 60 parts by mass, respectively, and 0.2 parts by mass of 1,3-di-o-tolylguanidine (guanidine accelerating agent, SANCELER DT available from Sanshin Chemical Industry Co., Ltd.) and 0.5 parts by mass of N-cyclohexyl-2-benzothiazolylsulfenamide (sulfenamide accelerating agent, NOCCELER (registered trade name) CZ available from Ouchi Shinko Chemical Industrial Co., Ltd.) were further blended for the crosslinking component.

The proportions R and S had the following relationships:

$$2R = 0.7 = 0.7 = S \tag{1}''$$

$$0.5R + S = 0.875 > 0.4 \tag{2}''$$

Therefore, the above expressions (1) and (2) were satisfied.

Comparative Example 4

A rubber composition was prepared in substantially the same manner as in Example 4, except that the proportion R of 4,4'-dithiodimorpholine and the proportion S of sulfur for the crosslinking component were 0.2 parts by mass and 0.7 parts by mass, respectively.

The proportions R and S had the following relationships:

$$2R = 0.4 < 0.7 = S \tag{1}''$$

$$0.5R + S = 0.8 > 0.4 \tag{2}''$$

Therefore, the expression (2) was satisfied, but the expression (1) was not satisfied.

Comparative Example 5

A rubber composition was prepared in substantially the same manner as in Example 4, except that the proportion R of 4,4'-dithiodimorpholine and the proportion S of sulfur for the crosslinking component were 0.2 parts by mass and 0.3 parts by mass, respectively.

The proportions R and S had the following relationships:

$$2R = 0.4 > 0.3 = S \tag{1}''$$

$$0.5R + S = 0.4 = 0.4 \tag{2}''$$

Therefore, the expression (1) was satisfied, but the expression (2) was not satisfied.

<Production of Semiconductive Roller and Evaluation for Anti-Scorching Property>

The rubber compositions prepared in Examples and Comparative Examples were stored at an ordinary temperature for one week. Thereafter, the rubber compositions were each fed into a φ60 extruder (available from Nakata. Engineering Co., Ltd.), and extruded into a tubular body having an outer diameter of 16 mm and an inner diameter of 6.5 mm at a rotation speed of 30 rpm at a temperature of 80° C. Then, the tubular body was checked for defective extrusion due to scorching.

A tubular body suffering from the defective extrusion due to the scorching was rated as unacceptable (x), and a tubular body free from the scorching was rated as acceptable (○). The subsequent process operation was not performed on the tubular body rated as unacceptable (x).

On the other hand, the tubular body rated as acceptable (○) was fitted around a temporary crosslinking shaft, and crosslinked in a vulcanization can at 160° C. for one hour. Then, the crosslinked tubular body was removed from the temporary shaft, then fitted around a shaft having an outer diameter of 7.5 mm and an outer peripheral surface to which an electrically conductive thermosetting adhesive agent (polyamide adhesive agent) was applied, and heated in an oven at 160° C. Thus, the tubular body was bonded to the shaft.

Subsequently, opposite end portions of the tubular body were cut, and the outer peripheral surface of the resulting tubular body was traverse-polished by a cylindrical polishing machine, and then mirror-polished to an outer diameter of 16.00 mm (with a tolerance of 0.05). Thus, a roller body unified with the shaft was produced.

After the outer peripheral surface of the roller body thus produced was wiped with alcohol, the roller body was set in a UV irradiation apparatus (PL21-200 available from Sen Lights Corporation) with the outer peripheral surface spaced 50 mm from a UV lamp. The roller body was irradiated with ultraviolet radiation at wavelengths of 184.9 nm and 253.7 nm for 15 minutes each time the roller body was rotated about the shaft by 90 degrees. Thus, an oxide film was formed in the outer peripheral surface of the roller body. In this manner, a semiconductive roller was produced.

<Evaluation for Resistance to Permanent Compressive Deformation>

A new cartridge (including a toner container containing toner, a photoreceptor body, and a developing roller kept in contact with the photoreceptor body) for a commercially available laser printer was prepared, and the semiconductive rollers produced in the aforementioned manner were each incorporated as a developing roller in the cartridge instead of the original developing roller.

The laser printer was operative with the use of a positively-chargeable nonmagnetic single-component toner, and capable of forming images on up to 4000 A4-size sheets (declared value) as determined by a measurement method specified in Japanese Industrial Standards JIS X6932:2008 "Method for the determination of toner cartridge yield for color printers and multifunction devices that contain printer components."

The semiconductive roller was evaluated for the resistance to the permanent compressive deformation immediately after the semiconductive roller was incorporated in the cartridge (initial evaluation) and after the cartridge was stored at a temperature of 45° C. for 5 days (post-storage evaluation). More specifically, with the cartridge set in the laser printer, images were sequentially formed on 20 plain paper sheets at a density of 1% at a temperature of 23.5° C. at a relative humidity of 55%, and then solid images were formed on two plain paper sheets. The initial evaluation and the post-storage evaluation for the resistance to the permanent compressive deformation were performed based on the following criteria.

◯: Any image defect such as streaking which may otherwise occur due to the permanent compressive deformation of the semiconductive roller was not observed in the black solid images. The semiconductive roller was free from the permanent compressive deformation.

x: Image defect was observed. The semiconductive roller suffered from the permanent compressive deformation.

The results are shown in Tables 3 and 4.

TABLE 3

|  | Example 1 | Example 2 | Example 3 | Comparative Example 1 | Comparative Example 2 | Comparative Example 3 |
|---|---|---|---|---|---|---|
| Parts by mass Rubber | | | | | | |
| GECO | 60 | 60 | 60 | 60 | 60 | 60 |
| NBR | 40 | 40 | 40 | 40 | 40 | 40 |
| Crosslinking component | | | | | | |
| BALNOCK R | 0.4 | 0.3 | 0.35 | 0.3 | 0.2 | 0.2 |
| Sulfur powder | 0.3 | 0.5 | 0.7 | 1 | 0.5 | 0.3 |
| ACCEL 22-S | 0.3 | 0.3 | 0.3 | 0.3 | 0.3 | 0.3 |
| SANCELER TS | 0.7 | 0.7 | 0.7 | 0.7 | 0.7 | 0.7 |
| SANCELER DT | — | — | — | — | — | — |
| NOCCELER CZ | — | — | — | — | — | — |
| (1) $2R \geq S$*[1] | ◯ | ◯ | ◯ | x | x | ◯ |
| (2) $0.5R + S > 0.4$*[1] | ◯ | ◯ | ◯ | ◯ | ◯ | x |
| Evaluation | | | | | | |
| Anti-scorching property | ◯ | ◯ | ◯ | x | x | ◯ |
| Resistance to permanent compressive deformation | | | | | | |
| Initial | ◯ | ◯ | ◯ | — | — | ◯ |
| Post-storage | ◯ | ◯ | ◯ | — | — | x |

*[1] ◯ means that the expression was satisfied, and x means that the expression was not satisfied.

TABLE 4

|  | Example 4 | Comparative Example 4 | Comparative Example 5 |
|---|---|---|---|
| Parts by mass Rubber | | | |
| GECO | 40 | 40 | 40 |
| NBR | 60 | 60 | 60 |
| Crosslinking component | | | |
| BALNOCK R | 0.35 | 0.2 | 0.2 |
| Sulfur powder | 0.7 | 0.7 | 0.3 |
| ACCEL 22-S | 0.3 | 0.3 | 0.3 |
| SANCELER TS | 0.7 | 0.7 | 0.7 |
| SANCELER DT | 0.2 | 0.2 | 0.2 |
| NOCCELER CZ | 0.5 | 0.5 | 0.5 |
| (1) $2R \geq S$*[1] | ◯ | x | ◯ |
| (2) $0.5R + S > 0.4$*[1] | ◯ | ◯ | x |
| Evaluation | | | |
| Anti-scorching property | ◯ | x | ◯ |
| Resistance to permanent compressive deformation | | | |
| Initial | ◯ | — | ◯ |
| Post-storage | ◯ | — | x |

*[1] ◯ means that the expression was satisfied, and x means that the expression was not satisfied.

The results for Examples 1 to 4 and Comparative Examples 1 to 5 shown in Tables 3 and 4 indicate that, where the four types of compounds (a) to (d) are used in combination as the crosslinking component for the rubber composition, and the proportion R (part by mass) of 4,4'-dithiodimorpholine (a) and the proportion S (part by mass) of sulfur (b) satisfy the above expressions (1) and (2), it is possible to provide a semiconductive roller including a roller body which is flexible and less susceptible to the permanent compressive deformation with a reduced compression set, and can be produced without the scorching and the waste of the rubber composition in the extrusion.

What is claimed is:

1. A semiconductive roller comprising a roller body made of a crosslinked product of a rubber composition,
the rubber composition comprising:
a rubber component including epichlorohydrin rubber and diene rubber, wherein the diene rubber is a non-oil-extension acrylonitrile butadiene rubber; and
a crosslinking component including:
(a) 4,4'-dithiodimorpholine;
(b) sulfur;
(c) a thiourea compound; and
(d) a thiuram accelerating agent;
wherein the epichlorohydrin rubber is present in a proportion of not less than 15 parts by mass and not greater than 80 parts by mass based on 100 parts by mass of the overall rubber component,
wherein the diene rubber is present in a proportion of not less than 20 parts by mass and not greater than 85 parts by mass based on 100 parts by mass of the overall rubber component,
wherein the thiourea compound is present in a proportion of not less than 0.1 part by mass and not greater than 1 part by mass based on 100 parts by mass of the overall rubber component,
wherein a proportion R (part by mass) of 4,4'-dithiodimorpholine and a proportion S (part by mass) of sulfur based on 100 parts by mass of the overall rubber component satisfy the following expressions (1) and (2):

$$2R \geq S \quad (1)$$

$$0.5R + S > 0.4 \quad (2), \text{ and}$$

wherein said roller body has an oxide film formed in an outer peripheral surface thereof, and wherein said roller body has a type-A durometer hardness in the range of 52 to 56.

2. The semiconductive roller according to claim 1,
wherein the proportion R of 4,4'-dithiodimorpholine is not less than 0.3 parts by mass and not greater than 2 parts by mass based on 100 parts by mass of the overall rubber component, and
wherein the proportion S of sulfur is not less than 0.2 parts by mass and not greater than 0.7 parts by mass based on 100 parts by mass of the overall rubber component.

3. The semiconductive roller according to claim 2,
wherein the epichlorohydrin rubber is present in a proportion of not greater than 70 parts by mass based on 100 parts by mass of the overall rubber component, and
wherein the diene rubber is present in a proportion of not less than 30 parts by mass and not greater than 70 parts by mass based on 100 parts by mass of the overall rubber component.

4. The semiconductive roller according to claim 3,
wherein the crosslinking component further includes a guanidine accelerating agent and a sulfenamide accelerating agent,
wherein the guanidine accelerating agent is present in a proportion of not less than 0.1 part by mass and not greater than 1 part by mass based on 100 parts by mass of the overall rubber component, and
wherein the sulfenamide accelerating agent is present in a proportion of not less than 0.2 part by mass and not greater than 1.5 parts by mass based on 100 parts by mass of the overall rubber component.

5. The semiconductive roller according to claim 1,
wherein the crosslinking component further includes a guanidine accelerating agent and a sulfenamide accelerating agent.

6. The semiconductive roller according to claim 5,
wherein the guanidine accelerating agent is present in a proportion of not less than 0.1 part by mass and not greater than 1 part by mass based on 100 parts by mass of the overall rubber component, and
wherein the sulfenamide accelerating agent is present in a proportion of not less than 0.2 part by mass and not greater than 1.5 parts by mass based on 100 parts by mass of the overall rubber component.

7. The semiconductive roller according to claim 1, which is incorporated as a developing roller or a charging roller in an electrophotographic image forming apparatus.

8. The semiconductive roller according to claim 1,
wherein the epichlorohydrin rubber is present in a proportion of not greater than 70 parts by mass based on 100 parts by mass of the overall rubber component, and
wherein the diene rubber is present in a proportion of not less than 30 parts by mass and not greater than 70 parts by mass based on 100 parts by mass of the overall rubber component.

* * * * *

UNITED STATES PATENT AND TRADEMARK OFFICE
CERTIFICATE OF CORRECTION

PATENT NO. : 10,437,172 B2
APPLICATION NO. : 15/797887
DATED : October 8, 2019
INVENTOR(S) : Daijiro Suzuki Page 1 of 1

It is certified that error appears in the above-identified patent and that said Letters Patent is hereby corrected as shown below:

On the Title Page

And in the Specification, at Column 1, Line 1, change the Title "Semiconductor Roller" to --Semiconductive Roller--

Signed and Sealed this
Twenty-fourth Day of December, 2019

Andrei Iancu
*Director of the United States Patent and Trademark Office*